o Printed Specification Available
F. STITH.
Hemp Brake.
8798X
Patented April 22, 1835.
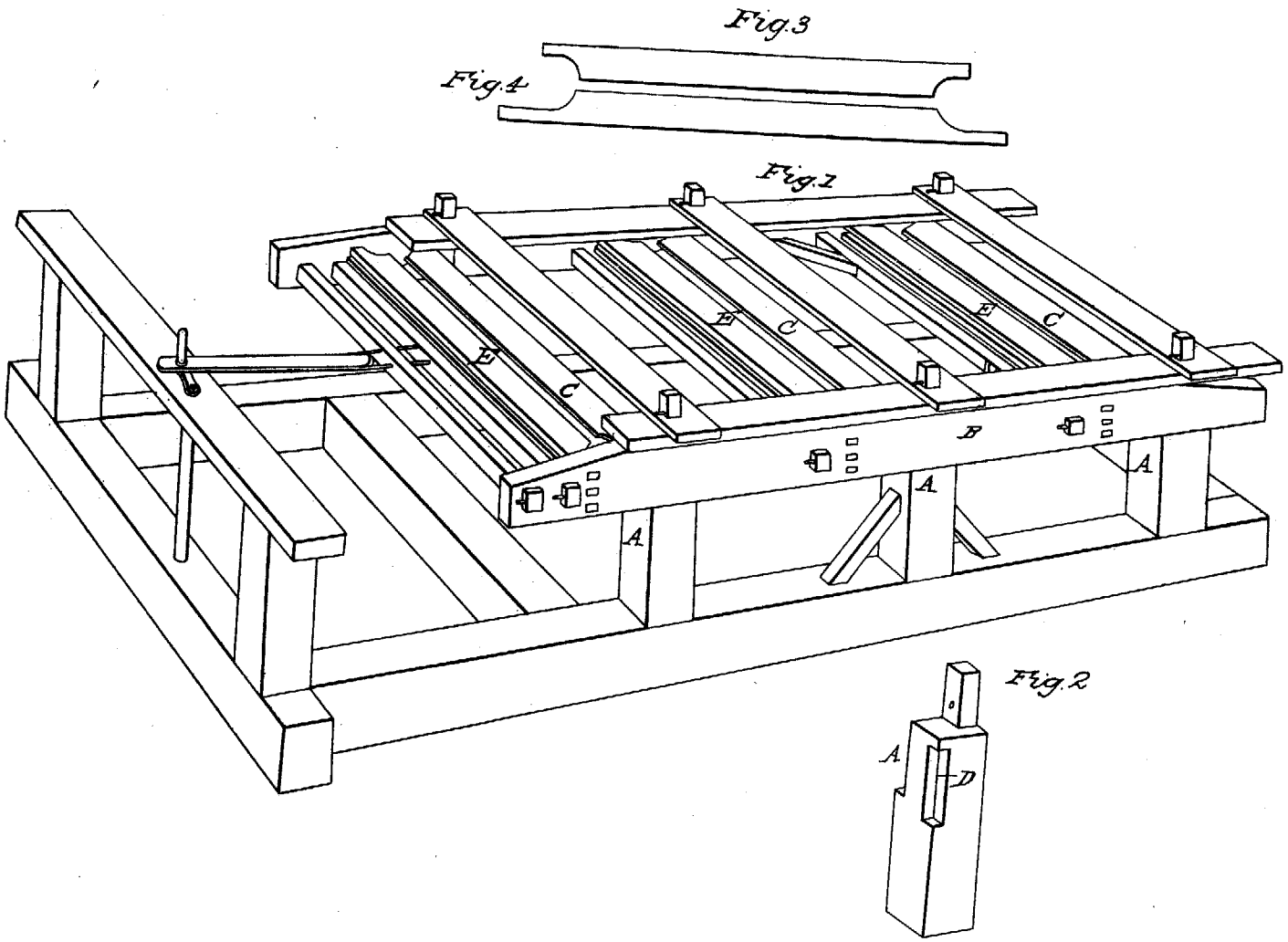
N. PETERS, Photo-Lithographer, Washington, D. C.

Ferdinando Stith 1

8798 X Letters Patent.

The Schedule referred to in these Letters Patent, and making
part of the same, containing a description in the words of the said
Ferdinando Stith, himself of his improvement in a machine for
the purpose of breaking of hemp and flax.

To all to whom these presents shall come.
Be it known that I, Ferdinando Stith of the Town of Franklin
County of Williamson and State of Tennessee, have invented
a new and useful machine for breaking of hemp, and flax and that the
following is a full and exact description of the construction and opera-
tion of the said machine as invented and put in operation by me at my Hays
creek plantation in this County. Viz. The brake which I had put up at
my plantation during the last Autumn, consists of two parts which I call
male and female or running and stationary frames. The stationary or female
frame is constructed after the following manner. The basement consists
of two pieces of scantling placed parallel and opposite to each other and
securely framed together by two crossbars of the same description of
scantling, this basement is 13 feet long and 4 feet wide and the scant-
ling of which it is made 5 inches wide and 6 inches thick. upon each
of the long scantling, stand three uprights 4 feet apart, and the
frame being 4 feet wide makes them 4 feet apart every way.
These uprights are three feet in hight of timbers of timbers 5½
or 6 inches wide and three inches thick standing the broad way
across the long timbers of the base. At 18 inches from the base end
of these uprights are shouldered on their outer sides two inches
deep, and extending to their upper extremities. These shoulders
are for the purpose of receiving and supporting the runners of
the Male portion of the brake. At eight inches above these
shoulders the uprights are cut into tenants to fasten on the up-
per upper longitudinal timbers of the stationary frame, these timbers
are 10 feet 10 inches long 5 inches wide and 6 inches thick.
Lastly these uprights terminate in tenants about 2½ inches
each way to hold on the upper cross bars three in number
4 feet 9 inches long 6 inches wide by two and a half inches
thick. The middle set of uprights are braced each way forward
and back. From the front of each of the uprights just below
the tenants for the upper longitudinal timbers and opposite
to the part shouldered to receive the running frame, blocks are
taken out to the number desired, say 3.4.5 or more one inch
deep, one inch wide and about one inch and a half apart,
to receive the slats which constitute the female or stationary
part of the brake. Into these mortices are resting places thus
formed, are fitted the back parts of the slats. these slats are
made of hickory timber split out and dressed down to about
one inch in thickness on their backs, and diminished to a
half inch in front. they are about 3 or 4 inches wide and
four feet long, and fitted into the places designed for them
in the uprights. These female slats being fitted to their places
are made fast in them, by means of plates of iron 6 in
number one over each end of each set of plates. These plates
are 10 inches long 1½ inches wide, and a quarter of an inch
thick. they are fitted over the fronts of the slats by cutting
of them down in front, in the form of a shoulder so that
the plates rest on them all level, through each of these plates
of iron run two boults which passing also through the uprights are
made secure by screw taps on their extremities. On the basement frame
of the brake, rests three heavy brace pieces of plank 6 feet long and 18 inches broad; these are stationed in the rear of each set of uprights, and are
designed for the laborers to stand on. This constitutes the whole of the
female or stationary portion of the Machine. I will now describe
the male portion or the running frame; this consists of two
pieces of scantling 12 feet 9 inches long 7½ inches wide, by two and
a half half inches thick framed together by mortising cross bars in timbers 4 feet 8 inches long, 2 inches wide and 2½ inches thick. Three of these are tenoned [illegible] 8 inches in the rear of their respective sets of slats, pass through the runners so as to be keyed on the outside. The fourth bar is in front framed in the same way and serves with its neighbouring cross bar to secure the iron hook that holds the pitman. These front bars receive still greater security and strength by means of a couple of iron bolts that run through these, and bind them both together on each side of the hooked bolt that holds the pitman, at suitable distances these runners receive the male slats by sets of two three or more slats for each set; this running frame with its sets of swords or slats and cross bars are so framed and fitted as to straddle the before described stationary frame, and rest on the shoulders of the same. The machine that I have had constructed, having been designed for experiment, contains three brakes in it each constructed to accomodate two or three slats, these slats like those of the stationary frame, are of hickory timber about one and a half inches thick on the back part and tapering in front to a half inch made round & smooth on the edges, and between three and four inches broad. The ends of these slats terminate in tenons which pass through the sides of the runners each way, and are [illegible] stayed fast by means of their shoulders on the insides and the keys of the cross bars on the outsides of the runners that one of the cross bars of the running frame which stands in the rear is furnished with braces. This constitutes the whole of what I call the male portion of the machine.

The machine is propelled by water power by means of a wrist crank on the upper extremity of the shaft of my water wheel, every revolution of the wheel then by the aid of the pitman gives a play of 11 inches to the running frame. This running frame with its sets of male slats are placed in such relation to the

8798 K in the permanent state of the stationary frame that at every re-
volution the one set passes into the other and recede again;
to each Laborer now takes his stand on the broad plank –
placed on the basement of the stationary frame and with
both hands feeds the machine first holding the hemp by
one extremity and then by the other, shaking of it occasionally
until he sees that it is well broke and freed from herds. he
then hands it to the attendant or lays it aside and takes an
another turn of the raw material. I propose to have three
or four brakes to each Machine. to put one hand to each brake,
and to let a fourth or a fifth as the case may be, wait on the
whole, to hand up the raw material and to lay aside the
clean hemp. From the experiments that I have made with
the Machine now in operation at my plantation, I am
satisfied that it may be equally well put in motion by horse
or steam power, I am also convinced that it may be ex-
tended or diminished on the same plan as to employ advan-
tageously 2. 3. 4. 5. or more hands according to the power that
can be brought to act on it. I have learnt from actual
experiment that the machine will do a good business at
so only five strokes or revolutions in the minute, and that its
operations improve with the velocity of its movements
that the proper principle for regulating its speed is the greatest
at which a hand can feed it. which is near 110 strokes in the minute
For the purpose of lessening the friction, the wear and the power
necessary to propel the machine. I propose to rest the runners
on friction wheels placed on the shoulders of the uprights,
or on Metallic plates, also plating the under surfaces of the runners with
iron or other metal. Specifications_ What I claim as my
own invention and not previously known in the above
described machine is the plan of running a brake in
the horizontal manner, and so constructing of it as to work
one two three four or more brakes at the same time and in
the

8798X the same frame. The advantage that I conceive to exist in my mode of confining the slats, is that it allows them to spring while they are still held fast, each to its place, and the facility with which one is taken out and another substituted in its place, when it becomes necessary to shift them. The slats of my brakes are all diminished in thickness from either extremity to the centre, so as to enlarge the spaces between them in the central portion while they approximate towards either end.

Ferdinando Stith

Witnesses
Tho Hardiman
Jas. Hogan Jr.

(1632 words)

(Drawing)

(Granted April 22. 1835)